Patented Dec. 1, 1936

2,062,842

UNITED STATES PATENT OFFICE 2,062,842

SULPHATION PRODUCTS OF ALIPHATIC CARBINOLS AND A PROCESS OF PREPARING THEM

Adolf Steindorff and Hans Lange, Frankfort-on-the-Main-Hochst, and Karl Horst, Hofheim-on-Taunus, Germany, assignors to General Aniline Works, Inc., New York, N. Y., a corporation of Delaware No Drawing. Application February 23, 1933, Serial No. 658,238. In Germany February 29, 1932

4 Claims. (Cl. 260—99.12)

The present invention relates to sulphation products of aliphatic carbinols and a process of preparing them.

We have found that sulphation products of aliphatic carbinols are obtainable by reducing condensation products of aliphatic ketones or of a mixture of such ketones, the said ketones having the following general formula:

$$R-CO-R_1$$

wherein R stands for an alkyl group having from 4 to 6 carbon-atoms and $R_1$ stands for an alkyl group having at most 4 carbon-atoms, and treating the carbinols thus obtained with sulphating agents. For this purpose, there may be used all condensation products of ketones, for instance, those obtainable by an alkaline or acid treatment of the ketones according to one of the known methods.

The reduction of the condensation products of the said ketones, which may be carried out catalytically or by treatment with sodium and alcohol, may be conducted so that either mixtures of ketones and carbinols or only carbinols are obtained.

The sulphation of the carbinols may be performed, if desired, in the presence of a solvent or diluent, by means of known sulphating agents, such as, sulphuric acid, chloro-sulphonic acid, sulphur trioxide, solutions of sulphur trioxide in sulphuric acid, advantageously at a temperature of about 0° C. to 50° C.

As ketones may be used, for instance, acetone, diethylketone, methylethylketone, methylpropylketone. If acetone is used, the reaction may take the following course:

The following examples serve to illustrate the invention but they are not intended to limit it thereto, the parts being by weight, unless otherwise stated:

(1) Mesityloxide—which may be obtained from diacetone alcohol by splitting off of water—together with hydrogen is continuously passed over a platinum catalyst at temperatures in the neighborhood of 200° C. 120 parts of the hydrogenation product are sulphated with 120 parts of chlorosulphonic acid at 0° C. to +5° C. and the sulphation product is subsequently neutralized by means of aqueous caustic soda solution and standardized to a content of 50%.

By introducing 10-20 grams of the product thus obtained in a liter of caustic soda solution of 1.285 specific gravity, there is obtained a mercerizing bath of very good clearness, wetting- and shrinking effect.

(2) Mesityloxide is reduced into methylisobutylcarbinol in a pressure vessel at temperatures of 120° C.–160° C. and under a hydrogen pressure up to 100 atmospheres in the presence of a nickel catalyst which has been precipitated on pumice stone. The carbinol is sulphated at 8° C.–15° C. with approximately the calculated quantity of chlorsulphonic acid in ether as diluent; when the sulphation is finished, the ether solution is diluted with water, neutralized by means of caustic alkali solution, the ether is evaporated and, if desired, the solution is filtered and standardized to a content of 30%. It is very suitable for being used as an addition to mercerizing solutions just as the product obtainable according to Example 1.

(3) A condensation product obtainable from

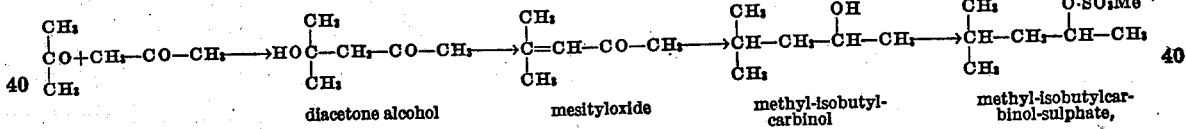

diacetone alcohol     mesityloxide     methyl-isobutyl-carbinol     methyl-isobutylcarbinol-sulphate, wherein Me stands for an alkali metal atom or ammonia.

Since there exists a large number of ketones suitable for the purposes of the present invention and since the condensation, reduction and sulphation may all be carried out in various manners the products obtained are of very different composition.

The new products obtainable according to the present invention may be used in the textile industry, for instance, as wetting agents, especially for mercerizing solutions.

crude acetone, consisting principally of a mixture of mesityloxide and phorone is hydrogenated, for instance, with the aid of a metal catalyst. 120 parts of the hydrogenation product are sulphated with 120 parts of chlorsulphonic acid at 15° C.–25° C., the sulphation product is subsequently neutralized by means of aqueous caustic soda solution and standardized to a content of 50%.

By adding to 1 liter of a caustic soda solution of 1.320 specific gravity 1-2 grams of the product thus formed, a mercerizing bath of very good clearness, wetting and shrinking effect is obtained.

(4) A condensation product of methylethylketone obtainable by treatment of methylethylketone with alkali is treated in an autoclave in the presence of a palladium catalyst under a hydrogen pressure of 5–10 atmospheres so that it is reduced for the greatest part to the carbinol stage. The hydrogenation product is dissolved in about twice the quantity of ethylene chloride and sulphated with fuming sulphuric acid of 20% at 20° C. to 30° C., the mass is diluted with water, separated from the ethylenechloride and neutralized by means of ethylamine.

(5) The condensation product of methylpropylketone is reduced to the carbinol stage, sulphated according to the method described in Example 3 and neutralized by means of ethylamine. The product thus obtained may be used for the preparation of wetting agents.

We claim:

1. The process which comprises sulphating a condensation product of the following general formula:

wherein R stands for a branched chain alkyl group of 4 to 6 carbon-atoms and R₁ stands for an alkyl group having at most 4 carbon-atoms, by means of a sulphation agent selected from the group consisting of sulphuric acid, chlorosulphonic acid, and sulphur trioxide at a temperature of about 0° C. to about 50° C.

2. The process which comprises sulphating methyl-iso-butylcarbinol by means of chlorosulphonic acid at a temperature of about 0° C. to about 50° C.

3. Sulphation products of the following general formula:

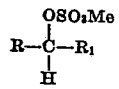

wherein R stands for a branched chain alkyl group of 4 to 6 carbon-atoms and R₁ stands for an alkyl group having at most 4 carbon-atoms, Me stands for an alkali metal atom or ammonia, having an excellent wetting power, especially in mercerizing solution.

4. Methyl-isobutylcarbinol-sulphate of the following formula:

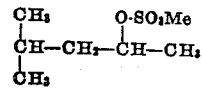

wherein Me stands for an alkali metal atom or ammonia having an excellent wetting power especially in mercerizing solution.

ADOLF STEINDORFF.
HANS LANGE.
KARL HORST.